July 21, 1936.  W. J. MORRILL  2,048,510
BELT TIGHTENER BASE
Filed Aug. 24, 1935
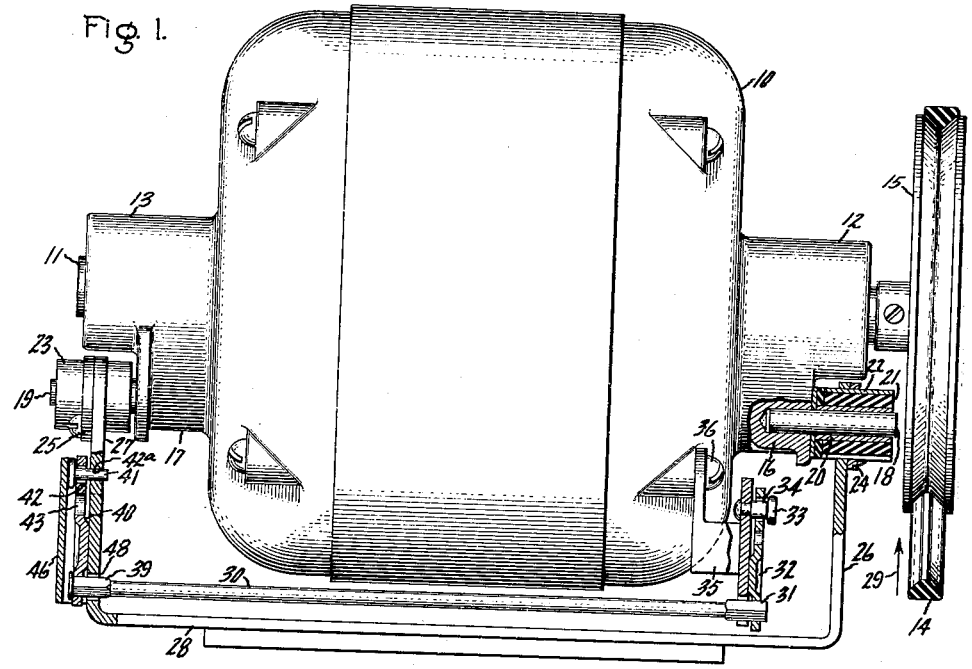
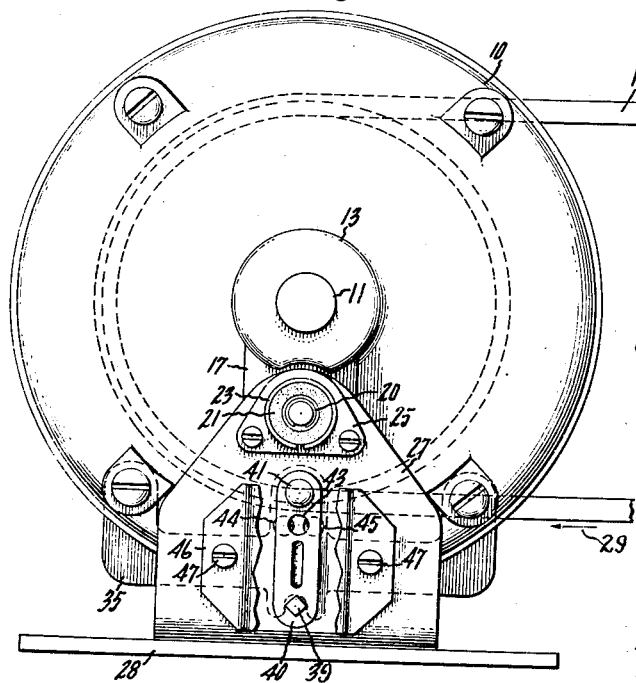
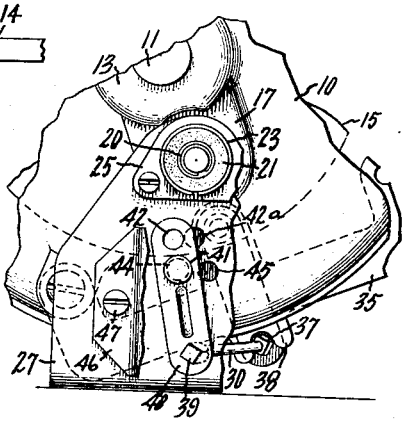
Inventor:
Wayne J. Morrill,
by Harry E. Dunham
His Attorney.

Patented July 21, 1936

2,048,510

UNITED STATES PATENT OFFICE 2,048,510

BELT TIGHTENER BASE

Wayne J. Morrill, Fort Wayne, Ind., assignor to General Electric Company, a corporation of New York Application August 24, 1935, Serial No. 37,706

11 Claims. (Cl. 74—242.15)

My invention relates to mountings for dynamo-electric machines.

It is often found desirable in dynamo-electric machines to utilize a driving connection which will permit slippage to prevent injury to the dynamo-electric machine under abnormal load conditions, such as occur in starting or during overloads. Friction pulleys and belt drives are often used for such connections and the torque which can be transmitted through such drives is a direct function of the friction between the driving contact surfaces. Various arrangements for biasing the driving or driven members for varying the contact friction have been devised, but these generally produce an undesirably high frictional contact during starting or result in an insufficient driving friction to transmit the higher loads. Adjustment during operation is generally impractical.

An object of my invention is to provide a dynamo-electric machine with a frictional driving connection having an arrangement utilizing a torsion spring rod for adjusting the initial or starting friction and wherein the operating friction of the connection is varied in accordance with the load transferred by the connection.

Another object of my invention is to provide a mounting for a dynamo-electric machine including a pivotal support and utilizing a displacing force exerted on the machine by the driving connection for varying the driving friction in accordance with the load and resiliently mounting the pivotal support for damping the vibrations which may be transmitted between the pivotal support and the mounting.

Further objects and advantages of my invention will be apparent from the following description referring to the accompanying drawing, and the features of novelty which characterize my invention will be pointed out with particularity in the claims annexed to and forming a part of this specification.

For a better understanding of my invention, reference is made to the accompanying drawing wherein Fig. 1 is a side elevation of a dynamo-electric machine provided with a mounting embodying my invention; Fig. 2 is an end elevation of the support and motor illustrated in Fig. 1 viewed from the end opposite the pulley; and Fig. 3 is a fragmentary end elevation illustrating the relative positions of the dynamo-electric machine and the initial biasing device mounting elements in a biased position.

Referring to the drawing, I have shown a dynamo-electric machine having a stationary member 10 and a rotatable member mounted therein on a shaft 11, the ends of which are journaled in hubs 12 and 13. Power is transferred from the dynamo-electric machine to the driven machine through a flexible frictional driving connection, comprising a V-belt 14 which engages a V-grooved pulley 15 mounted upon the rotatable shaft 11. In accordance with one aspect of my invention, the stationary member of the dynamo-electric machine is pivotally supported eccentrically with respect to the axis of the shaft 11, that is, eccentric to the rotational axis of the rotatable member. This pivotal support comprises bosses 16 and 17 on the hubs 12 and 13 having openings in which pins 18 and 19, respectively, are rigidly secured. These pins are pivotally mounted in metallic sleeves 20, and the sleeves are supported in bushings 21 of resilient material, such as rubber or the like. The rubber bushings 21 are tightly fitted in sleeves 22 and 23 which are rigidly connected by brackets 24 and 25 to upright arms 26 and 27 of the mounting base 28. This arrangement provides a resilient pivotal mounting for the dynamo-electric machine.

A resilient supporting arrangement is shown which, during normal operation of the dynamo-electric machine, utilizes a displacing force exerted by the belt 15 on the dynamo-electric machine to tension the belt in accordance with the load transmitted. In order to fully utilize the effect of this displacing force for increasing the frictional driving connection, the pivotal axis of the stationary motor supports 18 and 19 is eccentric to, but closely adjacent the axis of rotation of the rotatable member of the dynamo-electric machine carried on the shaft 11 and is located at a smaller distance from this rotational axis than the radius of the driving pulley 15.

In the supporting arrangement, illustrated in the drawing, the driving friction will be increased by tightening of the belt 14 when the motor rotates in a clockwise direction, as viewed in Figs. 2 and 3 and indicated by the arrow 29. Under these conditions, the lower side of the belt 14 will be the tight side and the upper side will be the loose side of the belt. The tension in the tight side of the belt acts as a displacing force on the machine and imposes a torque on the machine about the pivotal axis of the pins 18 and 19 tending to move the machine in a counterclockwise direction about this pivotal axis. Such a movement of the motor 10 moves the pulley 15 more tightly into the loop of the belt, thereby tightening the belt and increasing the friction of the driving connection. As the load increases the tension on the tight lower side of the belt increases with a corresponding increase in the friction of the driving connection. The tension in the loose upper side of the belt also creates an opposite but lesser displacing force about the pivotal axis, which imposes a torque upon the machine and pulley tending to move the pulley out of the belt loop and lessen the friction of the driving connection. Thus, the effective torque on the frictional driving connection about the pivotal axis through the pins 18 and 19 is the difference between the torques exerted by the tight and loose sides of the belt upon the rotational axis of the machine about this pivotal axis. In order to obtain a tightening of the belt it is, therefore, necessary that the torque about the pivotal axis, resulting from the displacing force exerted on the machine by the tight side of the belt, be greater than the torque about this axis resulting from the displacing force exerted on the machine by the loose side of the belt. A consideration of these displacing forces in relation to the pivotal axis will readily indicate that the location of the pivotal axis should be eccentric with respect to the rotational axis of the driving connection and closely adjacent thereto on the driving side of the frictional connection which, in the illustrated embodiment of my invention, is the tight belt side of the pulley.

This pivotal dynamo-electric machine mounting does not form part of my invention, but is the invention of Mr. Wilbur W. Warner, and is fully discussed in his copending application, Serial No. 753,112, filed November 15, 1934, and assigned to the same assignee as this application.

With such a pivotal mounting of the dynamo-electric machine, it becomes necessary to provide for maintaining the driving pulley 15 in contact with the belt 14 when the machine is at rest, so that there will be sufficient friction between the pulley and the belt to start the load. It is desirable under such conditions that a certain amount of slippage occurs in the frictional driving connection in order to prevent overloading of the machine. In accordance with another aspect of my invention, I obtain this necessary starting friction by biasing the machine and its pulley 15 into engagement with the belt loop by a resilient biasing member. In the illustrated embodiment of my invention, I prefer to utilize the resilient spring effect of a rod 30 under torsion for biasing the pulley 15 into engagement with the belt loop by swinging the machine about the pivotal axis through the pins 18 and 19. The rod 30 may be constructed of spring steel and is secured at one end against rotational movement to the stationary member 10 of the dynamo-electric machine by a square head 31 engaging a square opening in a link 32. This link is connected to the stationary member 10 by a pin 33 loosely extending through an enlarged opening 34 in the link and rigidly connected to a bracket 35. The bracket 35 is rigidly secured to the stationary member 10 by end shield bolts 36. The rod 30 extends through an open slot 37 in an ear 38 formed on the lower portion of the bracket 35. This mounting provides a relatively nonrotatable connection of the torsion spring rod 30 to the stationary member 10 of the motor and provides for a limited amount of twisting movement of the link 32. The other end of the rod 30 is also provided with a square head 39 engaging a corresponding square opening in an arm 40. A pin 41 extending through an enlarged opening 42 in the arm 40 secures the arm against rotational movement to the upright arm 27 of the motor mounting base 28, and provides for a limited amount of twisting movement of the arm about its longitudinal axis.

With the pin 41 extending through the hole 42 and the central opening 42a in the upright arm 27, as illustrated in Figs. 1 and 2, the dynamo-electric machine will be maintained in a centrally located upright position by the torsion rod 30. In such an upright position the rod 30 is not subjected to a torsion stress and is not utilized to produce a starting friction between the pulley 15 and the belt 14, but serves the purpose of a centering device to counteract any unbalancing of the motor, which might result from switches or the like attached to the frame of the dynamo-electric machine. Any shifting of the motor from an upright position exerts a torsional stress on the rod 30 which resists the shifting and maintains the motor upright. Thus, with the pin 41 in its central position shown in Figs. 1 and 2, any tightening effect of the belt tending to pivot the motor into the belt loop is reduced by the torsion rod 30.

The desired starting friction between the belt 14 and pulley 15 may be regulated by adjustment of the torsional strain in the rod 30. In the illustrated embodiment of my invention, this adjustment is obtained by changing the pivotal connection between the arm 40 and the upright arm 27 of the base 28 by placing the pin 41 in the lower opening 43 in the arm 40 and one of the openings 44 or 45, in the arm 27, at the side of the pulley 15 in engagement with the belt. This provides an adjustable torsional connection between the spring rod 30 and its mounting, and provides an arrangement for adjusting the starting friction of the driving connection. A guard plate 46 is rigidly connected by screws 47 to the upright arm 27 and engages the head of the pin 41 and the end of the rod 30, so as to retain the pin 41 in engagement with the arm 40 and the opening in the upright arm 27, and to retain the rod 30 in place. The rod 30 extends through an enlarged opening 48 in the upright arm 27 to provide a limited amount of swinging movement of the rod 30. As illustrated in Fig. 3, by placing the pin 41 in the opening 44, the rod 30 is twisted and the torsional strain thus set up in the rod produces a torsional spring effect which is transmitted to the motor frame 10 through the bracket 35. The relatively loose connection of the support 32 to the bracket 35 and of the support 40 to the upright arm 27 permits free lateral swinging movement of the rod 30 with respect to the motor 10 and the supporting base 28, and thereby provides against longitudinal bending of the torsion spring rod. Such bending of the rod 30 would produce a cantilever spring action which might counteract to a certain extent the torsional spring effect of the rod, as well as, hinder the efficient operation of the pivotally supported frictional drive mechanism.

By proper adjustment of the torsion of the spring rod 30, the friction between the pulley 15 and the belt 14 may be regulated, so that a certain amount of slippage of the belt will occur and the dynamo-electric machine will start under a light load and, hence, will not draw a harmful or excessive current. Having thus started, the resultant torque, due to the relative tensions in the tight and loose sides of the belt, will cause the stationary member 10 of the dynamo-electric machine to pivot about an axis passing through the pins 18 and 19 into the loop of the belt. As described above, the friction between the pulley 15 and the belt 14 will vary in accordance with the load transmitted by the frictional driving connection and the minimum friction between the belt 14 and the pulley 15 is determined by the initially biased position of the dynamo-electric machine produced by the spring action of the torsion rod 30.

While I have illustrated and described a particular embodiment of my invention, modifications thereof will occur to those skilled in the art. I desire it to be understood, therefore, that my invention is not to be limited to the particular arrangement disclosed and I intend, in the appended claims, to cover all modifications which do not depart from the spirit and scope of my invention.

What I claim as new and desire to secure by Letters Patent of the United States, is:

1. A dynamo-electric machine or the like including a stationary member and a rotatable member provided with a frictional driving connection, a pivotal support for said stationary member eccentric with respect to the axis of rotation of said rotatable member, and means including a torsion spring rod for initially biasing said stationary member with respect to said driving connection.

2. A dynamo-electric machine or the like including a stationary member and a rotatable member provided with a frictional driving connection, means including a torsion spring rod for biasing said stationary member with respect to said driving connection, means including a pivotal support for said stationary member eccentric to the rotational axis of said rotatable member for providing adjustment of said stationary member under varying load conditions, and means including a resilient mounting for said pivotal support for damping vibrations transmitted between said stationary member and said pivotal support.

3. A dynamo-electric machine or the like including a stationary member and a rotatable member provided with a frictional driving connection, means including a torsion spring rod for biasing said stationary member with respect to said driving connection, means including a pivotal support for said stationary member eccentric with respect to the rotational axis of said rotatable member for varying the friction of said driving connection in accordance with the torque transmitted thereby, a mounting base, and means including a resilient mounting for said pivotal support for damping vibrations transmitted between said pivotal support and said mounting base.

4. A mounting base for a dynamo-electric machine or the like including a stationary member and a rotatable member provided with a frictional driving connection, a supporting member, means for pivotally supporting said stationary member on said supporting member, and means including a torsion spring rod for biasing said stationary member with respect to said driving connection.

5. A dynamo-electric machine or the like including a stationary member and a rotatable member provided with a frictional driving connection adapted to exert a displacing force on said machine, means for pivotally supporting said stationary member eccentrically with respect to the rotational axis of said rotatable member and utilizing said driving connection displacing force for varying the driving friction in said driving connection, means including a torsion spring for biasing said stationary member with respect to said driving connection, and means for adjusting the initial bias of said stationary member.

6. A dynamo-electric machine or the like including a stationary member and a rotatable member provided with a frictional driving connection adapted to exert a displacing force on said machine, means pivotally supporting said stationary member eccentrically with respect to the rotational axis of said rotatable member and utilizing said driving connection displacing force for varying the driving friction in said driving connection, means including a mounting base having a resilient mounting for said pivotal supporting means, and means including a torsion spring rod secured against rotation movement with respect to said stationary member and being adjustably secured against rotational movement with respect to said mounting base for biasing said stationary member with respect to said driving connection.

7. A dynamo-electric machine or the like including a stationary member and a rotatable member provided with a frictional driving connection, means including a torsional spring for adjustably biasing said stationary member with respect to said driving connection, means including pivotal supports for said stationary member eccentric with respect to the rotational axis of said rotatable member for varying the friction of said driving connection in accordance with the torque transmitted thereby, supporting members, and means resiliently mounting said pivotal supports on said supporting members for damping the transmittal of vibrations between said pivotal supports and said supporting members.

8. A dynamo-electric machine or the like having a stator and a rotor provided with a frictional driving connection adapted to exert a displacing force on said machine, means supporting said stator and utilizing said driving connection displacing force for varying the driving friction in said driving connection, said supporting means including a mounting base, a pivotal connection between said stator and said mounting base, resilient mountings supporting said pivotal connections on said mounting base, and means including a torsion spring rod secured against rotational movement with respect to said stator and said mounting base and having a limited lateral pivotal connection thereto for biasing said stator with respect to said driving connection.

9. A dynamo-electric machine or the like having a stationary member and a rotatable member provided with a frictional driving connection, means including pivotal supports for said stationary member eccentric with respect to the rotational axis of said rotatable member for varying the friction of said driving connection in accordance with the torque transmitted thereby, means including a mounting base for supporting said pivotal supports, means for adjusting the no-load position of said dynamo-electric machine with respect to said mounting base, said no-load position adjusting means including a torsion spring rod, means for securing an end of said torsion spring rod against rotational movement with respect to said stationary member and provided with a limited laterally pivotal connection thereto, and means adjustably securing the other end of said torsion spring rod against rotational movement with respect to said mounting base and providing a limited swinging connection thereto for adjusting the torsional stress in said torsion spring rod.

10. A dynamo-electric machine or the like having a stationary member and a rotatable member provided with a frictional driving connection adapted to exert a displacing force on said machine, means supporting said stationary member and utilizing said driving connection displacing force for varying the driving friction in said driving connection, said supporting means including a mounting base, a pivotal connection between said stationary member and said mounting base, means for adjusting the no-load position of said dynamo-electric machine with respect to said mounting base, said no-load position adjusting means including a torsion spring rod, means for securing an end of said torsion spring rod against rotational movement with respect to said stationary member and providing a limited swinging connection thereto, and means adjustably securing the other end of said torsion spring rod against rotational movement with respect to said mounting base and providing a limited swinging connection thereto for adjusting the torsional stress in said torsion spring rod.

11. A dynamo-electric machine or the like having a stationary member and a rotatable member provided with a frictional driving connection adapted to exert a displacing force on said machine, means supporting said stationary member and utilizing said driving connection displacing force for varying the driving friction in said driving connection, said supporting means including a mounting base, a pivotal connection between said stationary member and said mounting base, resilient mountings supporting said pivotal connection on said mounting base, means for adjusting the no-load position of said dynamo-electric machine with respect to said mounting base, said no-load position adjusting means including a torsion spring rod, means for securing an end of said torsion spring rod against rotational movement with respect to said stationary member and providing a limited swinging connection thereto, and means for securing the other end of said torsion spring rod against rotational movement with respect to said mounting base and providing a limited swinging connection thereto.

WAYNE J. MORRILL.